United States Patent [19]

Gershuni et al.

[11] Patent Number: 4,976,113
[45] Date of Patent: Dec. 11, 1990

[54] APPARATUS FOR INDIRECT EVAPORATIVE GAS COOLING

[76] Inventors: Alexandr N. Gershuni, ulitsa Ulyanovykh, 33, kv. 19, Kiev; Valery S. Maisotsenko, ulitsa Sadovaya, 2I, kv. 7; Alexandr A. Kaminnik, I Vodo provodny pereulok, 9, kv. 7, both of Odessa; Vladilen K. Zaripov, ulitsa Tychiny, I2a, kv. 66, Kiev; Alexandr P. Nischik, ulitsa Raduzhnaya, II, kv. 40, Kiev; Alexandr I. Levterov, ulitsa T. Draizera, 8a, kv. 54, Kiev, all of U.S.S.R.

[21] Appl. No.: 477,893

[22] PCT Filed: Aug. 26, 1988

[86] PCT No.: PCT/SU88/00169
§ 371 Date: Apr. 25, 1990
§ 102(e) Date: Apr. 25, 1990

[87] PCT Pub. No.: WO90/02305
PCT Pub. Date: Mar. 8, 1990

[51] Int. Cl.[5] .............................................. F28D 5/00
[52] U.S. Cl. ........................................ 62/314; 62/304;
62/309; 261/104; 261/154; 261/DIG. 3
[58] Field of Search ................ 62/304, 309, 314, 315;
261/104, 154, DIG. 3

[56] References Cited

U.S. PATENT DOCUMENTS 2,960,847 11/1960 Potter ..................................... 62/314
2,990,696 7/1961 Fisher ..................................... 62/314

FOREIGN PATENT DOCUMENTS 552494 3/1977 U.S.S.R. .
407519 6/1977 U.S.S.R. .
620782 8/1978 U.S.S.R. .
659874 4/1979 U.S.S.R. .

*Primary Examiner*—Henry A. Bennet
*Assistant Examiner*—John Sollecito
*Attorney, Agent, or Firm*—Burgess, Ryan & Wayne

[57] ABSTRACT

An apparatus for indirect-evaporative gas cooling comprises a shell (1) with an inlet fitting (2) and outlet fittings (3,4). The inlet fitting (2) is for letting in a total gas stream. The outlet fitting (3) is for letting out the main gas stream and is located on the side of supplying the main gas stream to the consumer. The outlet fitting (4) is for letting the auxiliary gas stream to the atmosphere and is located on the side of the inlet fitting (2). The shell (1) accommodates a wettable capillary-porous solid (6), wherein there are provided moist ducts (7) and dry ducts (8) which intercommunicate on the side of the outlet fitting (3). This makes it possible to adjust the ratio between the surface areas of the dry and moist ducts, whereby the cooling efficiency is considerably increased.

2 Claims, 2 Drawing Sheets

APPARATUS FOR INDIRECT EVAPORATIVE GAS COOLING

FIELD OF THE ART

The present invention relates to heat-exchange apparatus of the indirect evaporative type with a direct contact of the gas being cooled and the liquid coolant.

PRIOR ART

In heat-exchangers of the aforementioned type heat is extracted from a gas stream called the main stream, through the partition wall of the apparatus and transferred to the liquid cooled by virtue of evaporation in a second gas stream called the auxiliary stream. A source of cold is the evaporating liquid which appears either as a film on the heat-exchanger wall or in a capillary-porous material attached to said wall. The main air stream flows along the ducts or passages established by the walls made of a moisture-proof material and called the dry ducts, whereas the auxiliary air stream flows along the ducts formed by, e.g., walls with a thin layer of a water-impregnated capillary-porous material and called therefore the moist ducts.

Known in the present state of the art is a heat-exchanger for indirect evaporative cooling of gases (U.S. Pat. No. 2,990,696), comprising a shell with two inlet fittings for admitting respectively the main stream and the auxiliary stream in a direction square to each other, and with two outlet fittings for letting out respectively the main and auxiliary streams. A plurality of dry and moist ducts are provided in the heat-exchange shell, arranged square to one another. The dry ducts are designed for the main stream to pass, while the moist ducts are intended for passing the auxiliary stream and contain a wettable capillary-porous material, which may be arranged on the wet duct walls so as to provide passing of the auxiliary stream in between the layers of the material, or be situated at the center of the duct, which in turn ensures passing of the auxiliary stream between the duct wall and the wettable capillary-porous material. The heat-exchanger under discussion has also a means for feeding the liquid that wets said capillary-porous material. It ensues from the foregoing that the present heat-exchanger makes use of a cross-over pattern of the flow of heat-transfer agents. It is known commonly to those skilled in the art that, other things being equal, the aforesaid flow pattern of heat-transfer agents is featured by a less amount of heat transferred as compared with the counter-current flow pattern. Besides, in this case a separate letting in and out of the auxiliary and main streams is used. This in turn sophisticates much the construction of the heat-exchanger.

One more state-of-the-art apparatus for indirect evaporative gas cooling (SU, A, No. 407, 519), is known to comprise a shell with an inlet fitting for a total gas stream incorporating the main and auxiliary streams, and with outlet fittings for the main and auxiliary streams, respectively. The shell is provided with a number of moist ducts of a wettable moisture-proof material, said ducts being arranged parallel to and communicating with one another. The apparatus has also a means for feeding the liquid intended to wet the capillary-porous material.

More specifically, the known apparatus comprises a number of series-arranged plates having alternating surfaces, which establish pairwise the dry ducts from a moisture-proof material, i.e., the material of said plates, and the moist ducts formed by the same surfaces coated with a capillary-porous material. On the side of the inlet fitting the moist ducts communicate with the outlet fitting for the auxiliary stream and are closed by the vertical walls, which guide the used-up auxiliary stream to the outlet fitting situated in the shell top portion, while on the side of the outlet fitting the moist ducts communicate with the dry ducts. The means for feeding the liquid wetting the capillary-porous material is in fact a water-filled tray located in the shell bottom portion. The capillary-porous material is wetted with water from the tray by virtue of capillary absorption.

The apparatus operates as follows. The common stream if fan-forced into the dry ducts. Then the stream is subdivided, at the outlet of the dry duct, into the main stream fed to the consumer and the auxiliary stream, which is directed counter-currently along the moist duct due to aerodynamic drag offered by the outlet fitting. The stream that passes between the surfaces of the plates forming the dry ducts, is cooled without changing their moisture content. The counter-current gas flow pattern made use of in the given case makes it possible to increase the amount of heat transferred. However, use of a number of series-arranged plates in this apparatus, forming the alternating dry and moist slit-shaped ducts restricts the mutual arrangement of said ducts, i.e., makes it impossible to change the ratio between the areas of heat-transfer surfaces of the dry and moist ducts. The apparatus features the area of the dry-duct surfaces equal to that of the moist-duct surfaces, which prevents further intensification of the cooling process. Besides, the apparatus fails to provide an efficient subdividing of the integrated stream into the auxiliary and the main ones at its outlet, since no provision is made on the side of the main stream outlet fitting for an increased aerodynamic drag necessary for an efficient subdividing of the total stream.

DISCLOSURE OF THE INVENTION

The principal object of the invention is to provide an apparatus for indirect-evaporative gas cooling, wherein the cooling efficiency would be increased due to an unlimited mutual arrangement of the dry and moist ducts within the apparatus and due to a variable shape of said ducts.

The foregoing object is accomplished due to the fact that in an apparatus for indirect-evaporative gas cooling, comprising a shell with an inlet fitting for a total stream and outlet fittings for respectively the main gas stream and the auxiliary gas stream which flows counter-currently to the main stream, and a plurality of moist ducts from a wettable capillary-porous material and of dry ducts from a moisture-proof material, both the moist and the dry ducts being located in the shell and intercommunicating on the side of the main stream outlet fitting, and a means for feeding a liquid wetting the capillary-porous material, according to the invention, the moist and dry ducts are established in a capillary-porous solid placed in the shell, while the dry ducts are essentially tubes whose ends extend beyond the capillary-porous solid on the side of the inlet fitting and are secured in a tube plate spaced somewhat apart from the capillary-porous solid so as to define a chamber communicating with the outlet fitting for the used-up auxiliary gas stream to let out.

Such a construction arrangement of the apparatus adds to the cooling efficiency. The fact that the wettable capillary-porous solid is accommodated in the shell makes possible an unlimited mutual arrangement of the dry and moist ducts, as well as any arbitrary shape of said ducts, particularly tubular in cross-section. This in turn enables one to adjust, within a wide range, the ratio between the areas of the dry and moist duct surfaces so that, e.g., the area of the dry ducts may substantially exceed that of the moist ducts, since the intensity of the heat-transfer process in the dry ducts is lower than that in the moist ducts.

It is expendient that the length of each projecting tube end be equal to within 0,03 and 0.15 of the respective dry duct length.

SUMMARY OF THE DRAWINGS

Given below is a detailed description of a specific exemplary embodiment of the invention illustrated by the accompanying drawings, wherein the same component parts are indicated with the same Reference Numerals, and wherein.

PREFERRED EMBODIMENT OF THE INVENTION

Figure 1:
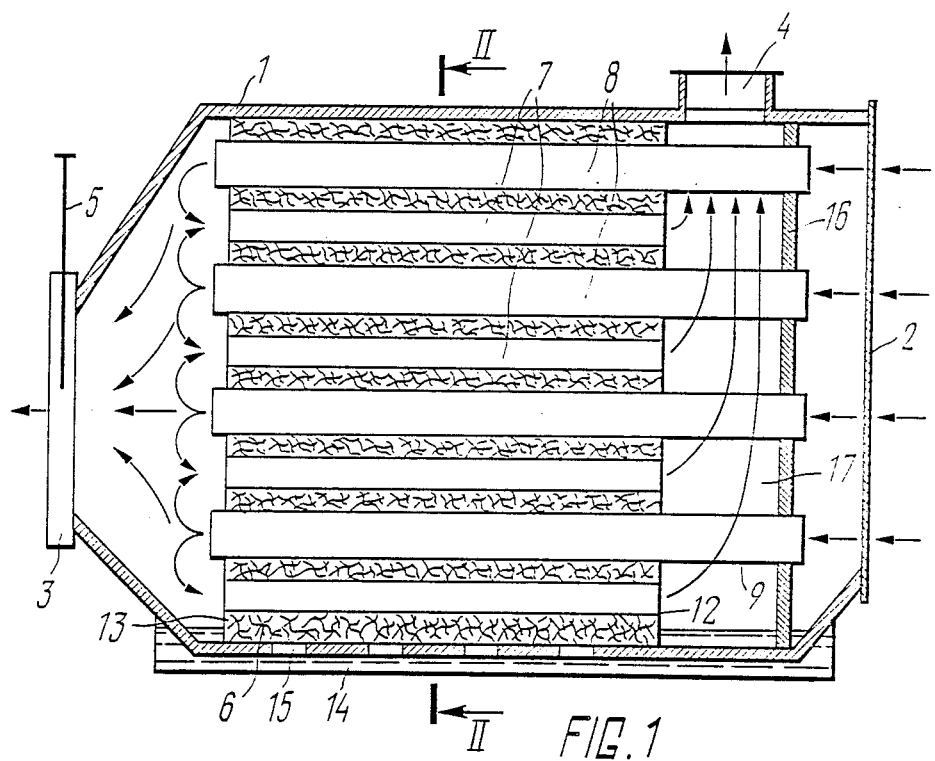
FIG. 1 is a schematic sectional view of an apparatus for indirect-evaporative gas cooling.

As is evident from FIG. 1 the apparatus for indirect-evaporative gas cooling comprises a shell 1 with an inlet fitting 2 and two outlet fittings 3, 4. The inlet fitting 2 is for admission of a total gas stream produced by, e.g., a blower fan. The outlet fitting 3 is for the main stream to let out and has an adjustable damper 5 adapted to reduce the flow passage area of the fitting. The outlet fitting 4 located in the shell top portion is for letting out to the atmosphere the used-up auxiliary stream flowing counter-currently to the main stream.

Figure 2:
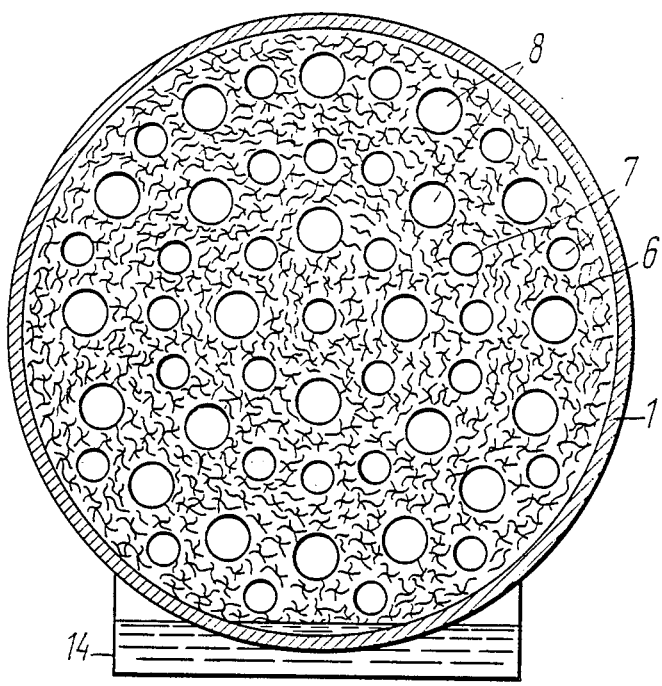
FIG. 2 is a section taken on the line II—II in FIG. 1.

As is indicated in FIGS. 1 and 2 the shell 1 accommodates a wettable capillary-porous solid 6, wherein a plurality of moist ducts 7 and dry ducts 8 are provided, said ducts 7 and 8 intercommunicating on the side of the outlet fitting 3.

In the present embodiment of the invention the dry ducts 8 are established by tubes 9 made of a moisture-proof material and inserted into the wettable capillary-evaporative solid 6. However, in an alternative embodiment shown in FIG. 3 the dry ducts 8 may be formed by a melt-off moisture-proof layer 10. The porosity of the material increases to a preset normal one in a direct proportion to the distance from the melt-off moisture-proof layer 10. The ends of the dry ducts extending beyond the solid 6 are established by tubes 11.

The fact that the wettable capilary-porous solid is accommodated in the shell 1 enables one to vary the ratio between the heat-transfer areas of the dry and moist ducts due to a possibility of a nonrestricted arrangement of said ducts and of changing their shape. The ducts 7 and 8 may have various cross-sectional shape, in particular, a tubular shape.

The wettable capillary-porous solid 6 may be made of, e.g., fibers, a powder, or the similar particles. The particles constituting the solid 6 may or may not adhere to one another. Therefore the wettable capillary-porous solid may be made of a gauze-like, ceramic, woven, material, felt, cardboard, diverse fillings, sintered fibers or powders, and so on. The wettable capillary-porous solid 6 should be permeable, i.e., be free from closed or blind pores and should provide for lifting of the wetting liquid, by virtue of capillary forces, to an adequately high level, which determines the overall vertical size of the apparatus. It should be taken into account that when the solid 6 is constituted by loose particles use should be made of inserts, such as gauzes or nets, having adequate rigidity and permeable walls.

The capillary-porous solid 6 shown in FIG. 1 is made of a sintered metallofibrous material forming a rigid structure with end faces 12, 13. However, with a view to additionally changing the ratio between the surface areas of the dry ducts 8 and the moist ducts 7, the aforesaid surfaces may have any arbitrary shape, e.g., with the varying length of the ducts said surfaces may be stepped. Besides, when the capillary-porous solid is composed of loose particles, such as sand, glass beads, etc. it is expedient to use end grates to limit the solid 6.

The dry ducts 8 may be filled with a highly porous material (omitted in the Drawing), constituted by fibers and powders (having a minimized hydraulic resistance). This enables one to attain more intensified heat-transfer in the ducts. Intensification of the heat-transfer process is increased with increase in the thermal conductivity of the fibers and powders making part of said material, as well as in cases where the contact between the particles of the material and between these and the duct wall is bettered. As a result, the thermal conductivity of the porous material filling the dry ducts is also increased. The heat-transfer process in the dry ducts is also intensified by developing the inner surface of the ducts 8 by any known methods, e.g., by making grooves or slots therein.

Use of the wettable capillary-porous solid 6 provides for transportation of the liquid fed from the means for feeding the wetting liquid, to the evaporation surface of the moist ducts 7. As is indicated in FIGS. 1 and 2, used as the means for feeding the wetting liquid in a given embodiment of the invention is a tray 14 filled with water, wherein is immersed the bottom portion of the capillary-porous solid 6. The tray 14 has on opening 15 for feeding water to the capillaries of the solid 6. It is obvious that any other means for feeding the wetting liquid may be used instead of the tray 14, e.g., use can be made of an irrigation means providing for feed of the liquid to the evaporation surface of the moist ducts. Besides, any other easily vaporizable liquid may be used instead of water.

As can be seen from FIG. 1 a tube plate 16 is provided in the shell 1 to which are held the projecting ends of the tubes 9 forming the dry ducts. The tube plate 16 is spaced somewhat apart from a borderline 12 of the wettable capillary-porous solid 6, i.e., a chamber 17 is defined between the tube plate 16 and the borderline 12 for the used-up auxiliary gas stream to let out, said chamber 17 effecting precooling of the common gas stream and ensuring against intermixing of the admitted common gas stream and the used-up auxiliary gas stream.

Figure 3:
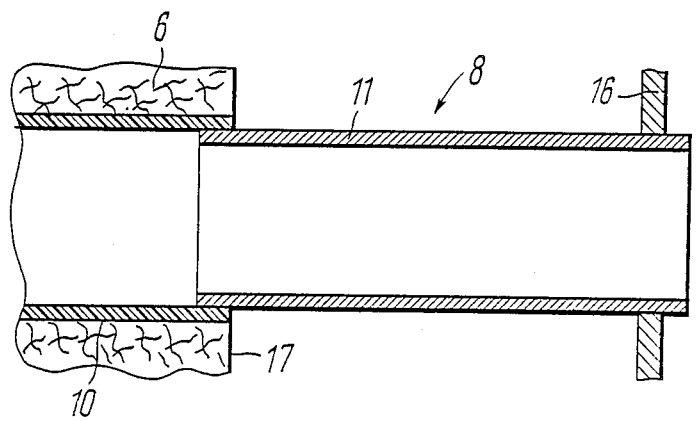
FIG. 3 is an alternative embodiment of a dry duct of the proposed apparatus.

Unlike the embodiment discussed hereinbefore FIG. 3 presents the construction of the apparatus in whose tube plate 16 are secured the tubes 11 forming the extended ends of the dry ducts 8. Thus, each of the tubes 11 is located substantially within the chamber 17, one its end being fixed to the wettable capillary-porous solid 6, while the other, in the tube plate 16.

It is known commonly to those skilled in the art that intensity of precooling increases when the portions of the tubes 9 situated in the chamber 17 and the tubes 11 are coated with a wettable capillary-porous material (omitted in the Drawing).

It is preferable that the length of each of the extending portions of the tubes 9 situated in the chamber 17, and that of each of the tubes 11 (as prepared in FIGS. 1 and 3) be equal to within 0.03 and 0.15 of each respective dry duct 8, i.e., it is favorable that the distance between the end 12 of the wettable capillary-porous solid 6 and the tube plate 16 be within the same limits. The range of variation of said distance is an optimum one with due account of the heat-and-mass transfer efficiency and aerodynamic drag offered by the used-up auxiliary stream. Design estimates and experimental findings demonstrate that when the length of said distance is less than 0.03 of the length of the dry ducts 8, the aerodynamics drag increases badly, which results in a reduced flow-rate of the auxiliary stream and hence in a drastically decreased cooling efficiency of the apparatus and an increased power consumption thereof. Conversely, when the length of said distance exceeds 0.15 of the dry duct length the efficiency of the evaporative cooling process occurring in the counter-current flow along the ducts 8 and 7 is materially reduced, which is also causative of a badly affected cooling efficiency of the apparatus. An optimum length of said distance falling within the aforesaid range is to be found in every particular case depending upon constructional and performance characteristics of the apparatus.

The aforedescribed apparatus for indirect-evaporative gas cooling operates as follows. A total stream is forced, with the aid of a blower fan (omitted in the Drawing), through the inlet fitting 2 into the dry ducts 8. While passing through segments of the tubes 9 located in the chamber 17, the total stream gets pre-cooled, which takes place due to heat-exchange with the auxiliary stream admitted to the chamber 17 from the moist ducts 7. Then the precooled total gas stream is further cooled while flowing along the dry ducts 8 in the wettable capillary-porous solid 6. Here, the outer surface of the dry ducts 8 is in contact with the wettable capillary-porous solid 6 which is wetted with water found in the tray 14 and fed through the opening 15 into the capillary of said solid. Thus, at the outlet of the tubes 9 the total gas stream is cooled down to the dew point without changing its moisture content. Here the total stream is subdivided into two streams, i.e., the main and the auxiliary. An efficient subdivision of the total stream into the two ones mentioned above is ensured due to an increased aerodynamic drag on the side of the outlet fitting 3 carried out by the adjustable damper 5 which decreases the flow passage area of the fitting 3. Provision of the adjustable damper 5 enables one to vary the ratio between the main and auxiliary gas streams. The main stream is directed through the outlet fitting 3 to the consumer, while the auxiliary stream is guided to the moist ducts 7 along which said stream flows counter-currently to the total stream. When the auxiliary stream flows along the moist ducts 7 there occurs the superficial heat- and mass-exchange process between the total stream passing along the tubes 9 and the auxiliary stream passing along the ducts 7 counter-currently to the main stream, said process proceeding through the heat- and mass-transfer surface of the tubes 9 and the surface of the wettable capillary-porous solid 6 forming the duct 7. As a result of said process the total gas stream gets cooled down to the dew point without changing its moisture content, while the auxiliary stream gets heated (due to heat withdrawal from the main gas stream) and humidified (due to evaporation of moisture from the wettable capillary-porous solid 6 thereinto). In this case the auxiliary stream temperature at the outlet of the ducts 7 will be somewhat below the temperature of the incoming total stream due to under recuperation, while its relative humidity will approximate 100 percent. These parameters of the auxiliary stream are important from the standpoint of its cooling power. That is why the auxiliary stream having such parameters is admitted to the chamber 17 before being let out into the atmosphere, for effecting the superficial heat-exchange with the admitted total stream which has the ambient temperature. For the most efficient utilization of the residual cooling power of the auxiliary stream the latter is directed for heat-exchange with the total stream by changing the direction of the auxiliary stream flow in the chamber 17 by 90 degrees, where by intense turbulization of said stream ensues. In this case, with the aforementioned parameters of the heat-exchanging streams the heat transfer coefficient effective on the outer surface of the tubes 9 is increased two- or three-fold. Such a factor enables one to increase the amount of heat transferred, which in turn result in a preliminary temperature decrease of the total stream before its final cooling inside the dry inducts located in the wettable capillary-porous solid 6. This in turn makes it possible to reduce to some extent the heat load on the heat-exchanger, thus adding to the gas cooling efficiency.

It should be noted that it becomes possible to substantially improve a number of performance construction features of the herein proposed apparatus. Thus, for instance, by changing the direction of flow of the auxiliary gas stream in the chamber 17 by 90 degrees and directing it upwards for letting it out into the atmosphere through the outlet fitting 4 it becomes possible to carry out more efficient separation of water drops from the auxiliary air stream. This in turn makes it possible to considerably reduce water consumption in the proposed heat-exchanger, which contributes also to higher cooling efficiency.

Thus, the herein-proposed apparatus for indirect-evaporative gas cooling is instrumental in a considerable increase in the cooling efficiency, a substantial temperature decrease of the main stream being attained without any additional power consumed. Besides, the performance and construction features of the proposed apparatus are improved due to reduced water consumption and provision of more reasonable conditions for admission and division of the heat-exchanging gas stream.

INDUSTRIAL APPLICABILITY

The herein-proposed apparatus for indirect evaporative gas cooling is applicable for air cooling in air conditioning systems of residential accommodations and production premises, as well as of driver's cabs and passenger compartments of transportation facilities.

What is claimed is:

1. An apparatus for indirect-evaporative gas cooling, comprising a shell (1) with a total gas stream inlet fitting (2), and outlet fittings (3, 4) respectively for a main stream and an auxiliary stream which flows counter-currently to the mainstream, and a plurality of moist ducts (7) provided in said shell (1) and made of a wettable capillary-porous material, and of dry ducts (8) made of a moisture-proof material, both the dry and the moist ducts intercommunicate on side of the shell on which mainstream outlet fitting is located (3), and a means for feeding a liquid wetting the capillary-porous material, characterized in that the respective moist and dry ducts (7, 8) are established in a capillary-porous solid (6) placed in the shell (1), while the dry ducts (8) are essentially tubes (9) whose ends extend beyond the capillary-porous solid on a side of the shell on which the inlet fitting is located (2) and are secured in a tube plate (16) spaced apart from the capillary-porous solid (6) so as to define an auxiliary gas outlet chamber (17) communicating with the outlet fitting (3).

2. An apparatus as claimed in claim 1, characterized in that the length of each projecting end of the tube (9) equals from 0.03 to 0.15 of the length of the respective dry duct (8).

* * * * *